United States Patent [19]

Sanino

[11] Patent Number: 5,273,188
[45] Date of Patent: Dec. 28, 1993

[54] MACHINE AND METHOD FOR THE METERED POURING OF PRECISE SMALL QUANTITIES OF FLOWABLE AERATED FOAMED FOOD PRODUCTS

[75] Inventor: Massimo Sanino, Cuneo, Italy

[73] Assignee: Soremartec S.A., Schoppach-Arlon, Belgium

[21] Appl. No.: 861,551

[22] Filed: Apr. 1, 1992

[30] Foreign Application Priority Data

Oct. 30, 1991 [EP] European Pat. Off. ........ 91830470.0

[51] Int. Cl.⁵ .............................................. B67D 5/00
[52] U.S. Cl. ..................................... 222/61; 222/195; 222/330; 222/396; 222/399; 222/482; 426/474
[58] Field of Search ................ 222/61, 195, 226, 330, 222/394, 396, 397, 399, 401, 481, 482, 554; 426/474, 498, 568

[56] References Cited

U.S. PATENT DOCUMENTS

| | | | |
|---|---|---|---|
| 3,286,932 | 11/1966 | Kibler | 222/394 X |
| 3,997,080 | 12/1976 | Langstroth | 222/61 |
| 4,450,981 | 5/1984 | Harg | 222/61 |
| 4,691,842 | 9/1987 | Foures | 222/397 X |
| 4,931,400 | 6/1990 | Jitsukawa | 222/330 X |
| 5,030,469 | 7/1991 | Mergelsberg | 426/568 X |
| 5,087,352 | 2/1992 | Cole, Jr. | 222/61 X |

FOREIGN PATENT DOCUMENTS 2218864 4/1972 Fed. Rep. of Germany .
8802721 4/1988 World Int. Prop. O. .

OTHER PUBLICATIONS

Soviet Inventions Illustrated, Section EI, Week 8820, 19 May 1988; Derwent Publications Ltd., London, GB; Class S, AN 88-138952/20 & SO-A-1 344 540 15 Oct. 1987.
Copy of European Search Report.

*Primary Examiner*—Andres Kashnikow
*Assistant Examiner*—Joseph A. Kaufman
*Attorney, Agent, or Firm*—Rothwell, Figg, Ernst & Kurz

[57] ABSTRACT

The product to be poured, which is typically constituted by an aerated product such as meringue mixture or the like, is admitted to a tank which is kept closed and only partially filled with the product to be poured. A continuous, static, relative aeriform pressure, typically of the order of 0.2-0.3 atmospheres, is maintained in the portion of the tank which is not occupied by the product. Precise small quantities of the product are poured through openings in the lower portion of the tank which are associated with delivery nozzles controlled by obturators, preferably of the cylindrical, male type.

8 Claims, 1 Drawing Sheet

MACHINE AND METHOD FOR THE METERED POURING OF PRECISE SMALL QUANTITIES OF FLOWABLE AERATED FOAMED FOOD PRODUCTS

BACKGROUND OF THE INVENTION

The present invention relates to machines for the metered pouring of fluid or "flowing" products (for example, liquid, creamy or pasty products).

1. Field of the Invention

Machines of this type (currently known as "pouring" and/or "batching" machines) are used widely in various sectors of industry and particularly in the food industry for pouring measured quantities of liquid, creamy or pasty products such as, for example, fillings, stuffings or trimmings for food products such as confectionery.

Most pouring/batching machines of the prior art provide for the use of metering and delivery cylinders. Pistons which are movable substantially sealingly in the cylinders can perform a first sliding stroke within their respective cylinders, during which each piston draws in or admits a certain quantity of the product to the cylinder, and a delivery stroke, which is usually performed in the opposite direction from the loading stroke, and during which the piston expels from the cylinder, usually through a nozzle at its end, a measured quantity of the material previously loaded into the cylinder.

A solution of this type is described, for example, in U.S. Pat. No. 4 787 534.

Another type of batching machine which is very widespread uses a manifold. In this case, the product to be poured is sent towards a manifold in a substantially continuous flow (that is, under dynamic conditions), several supply ducts or nozzles branching out from the manifold and usually being controlled by valve or tap structures, which can be moved alternately to open and closed positions, so as to discharge measured quantities of the product from the manifold.

Both the solutions described above have been found unsatisfactory in practice when the product to be delivered is an aerated product, that is, a product which contains a certain amount of gaseous or aeriform substances trapped within it. This is the case, for example, with the so-called meringue mixture which is used in the food industry (particularly in the confectionery industry) and which is prepared by whipping egg whites and sugars to a froth, usually with the addition of flavourings. A mass of meringue mixture has a specific gravity of the order of 0.5-0.6 combined with an intrinsic resilient mechanical compressibility due to the presence of the air trapped within the mixture.

Other aerated products currently used in the food industry are, for example, whipped cream, mayonnaise, sponge-cake mixture, etc.

The pouring of aerated products by machines with pistons of the type described above has the disadvantage that, precisely because of the large quantity of air in the product, conditions may arise in which the machine has great difficulty both in loading the product (for example, it may load a smaller quantity than envisaged as a result of the drawing-in of a large quantity of air) and in delivering the product (which tends to take place in spurts so that the product delivered is unevenly distributed).

In the case of machines with manifolds, in addition to these problems, it is also difficult to ensure that the product delivered is distributed evenly by the various metering nozzles; this is due—primarily—to the different paths which the flow of the product has to follow to reach the nozzles.

These problems mean, amongst other things, that there is a marked difficulty in precisely metering the quantity of the product delivered during each pouring operation.

Although this difficulty is tolerable when the quantity of the product delivered during each pouring operation is quite large, in practice, it is insurmountable when very small measured quantities (for example, of the order of ½ cm$^3$) of an aerated product with a low specific gravity (0.5-0.6—as in the case of meringue mixture or even lower values, for example 0.3) are to be delivered.

SUMMARY OF THE INVENTION

The object of the present invention is to provide a machine for the metered pouring of fluid products which can completely overcome all the problems and difficulties described above, particularly in relation to the pouring of aerated products.

BRIEF DESCRIPTION OF THE DRAWINGS

According to the present invention, this object is achieved by virtue of a machine having the specific characteristics recited in the following claims.

The invention will now be described, purely by way of non-limiting example, with reference to the appended drawings, in which.

DETAILED DESCRIPTION OF THE DRAWINGS

Figure 1:
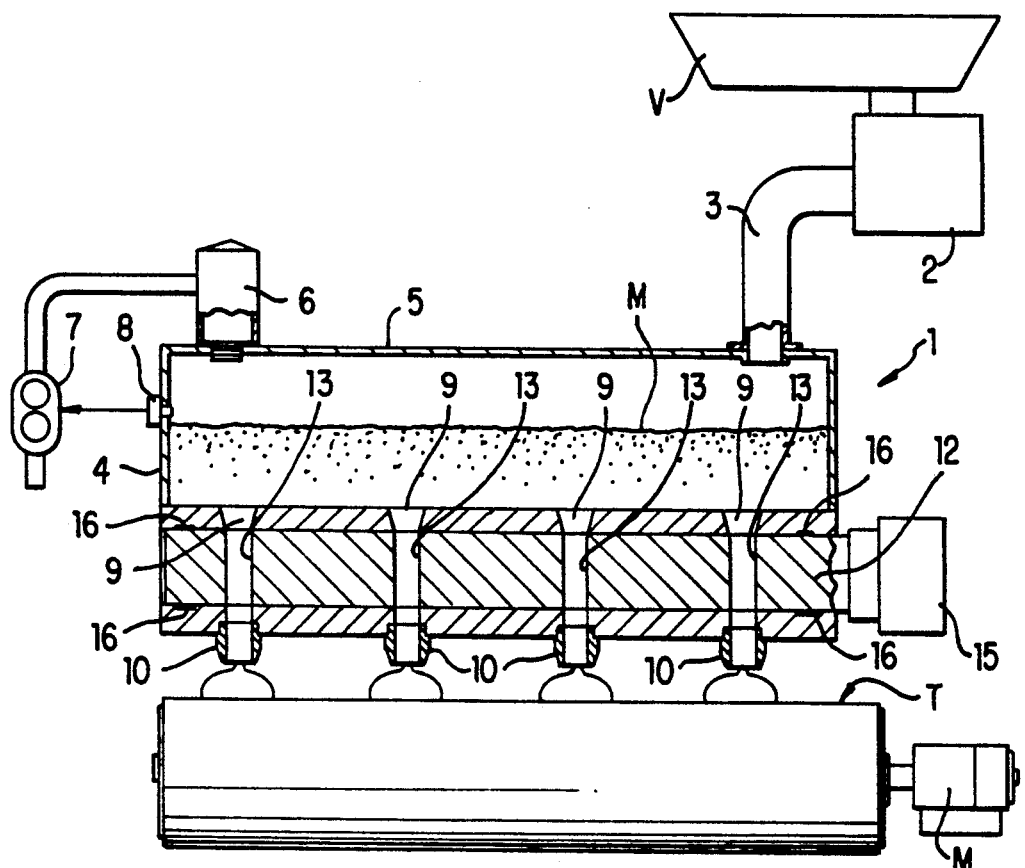
FIG. 1 is a front elevational view of a machine formed according to the invention with some parts cut away and sectioned for clarity of illustration.

In the drawings, a machine for the metered pouring of fluid or "flowing" products, such as aerated products like, for example, meringue mixture, is generally indicated 1.

As is known, this product is made of egg white which is whipped to a froth, possibly with the addition of sugars and flavourings such as chocolate, etc. After subsequent heating, for example, in an oven, the meringue mixture gives rise, as a result of the hardening of the egg white, to an aerated product known as meringue, which is compact but at the same time very light and can be used both to produce confectionery items covered with cream, whipped cream or the like, or as fillings for filled confectionery products.

Aerated products like meringue mixture, whipped cream, mayonnaise, etc., are usually produced on an industrial scale with the use of devices called turbo-mixers, one of which is generally indicated 2 in FIG. 1.

A turbo-mixer is constituted essentially by a generally cylindrical stator body with fins or similar appendages projecting radially inwardly of the cavity in the stator. A rotor, which is rotatable in the stator, has blades which, as a result of their rotation induced by the movement of the rotor (naturally along paths which do not interfere with the fins of the stator) have a forceful whipping effect on the ingredients of the meringue mixture which are admitted to the rotor chamber from a tank V. The whipping to a froth is usually facilitated by the blowing of air into the cavity in the turbo-mixer.

This is all according to widely known criteria which do not need to be described in detail herein and are not relevant for the purposes of an understanding of the invention.

The aerated product (in this case, the meringue mixture) prepared in the turbo-mixer 2 is supplied through a pipe 3 to a collecting tank 4 in which a certain amount of meringue mixture M collects.

The rate at which the turbo-mixer 2 operates (in practice, the rate at which the meringue mixture passes through the pipe 3) is regulated in a manner consistent with the volume of the tank 4, so that the tank 4, which is sealed at the top by a lid 5, is never completely full of meringue mixture.

In practice, the meringue mixture M only occupies the lower portion of the tank 4, leaving empty its upper portion which is thus filled by an aeriform mass (typically air). The upper portion of the tank 4 communicates with a pressure regulator 6 (for example, a device with a pneumatic plenum chamber) connected to a pump 7 (usually a pneumatic pump) which is operated intermittently in dependence on the detection signal supplied by a barometric sensor 8 which is sensitive to the aeriform pressure in the upper portion of the tank 4.

In particular, the pressure-regulating unit 6, 7, 8 is adjusted so as to keep the aeriform mass which is above the level of the free surface of the mass of meringue mixture M in the tank 4 at a relative pressure of the order of 0.2-0.3 atmospheres (an absolute pressure of 1.2-1.3 atmospheres).

Figure 2:
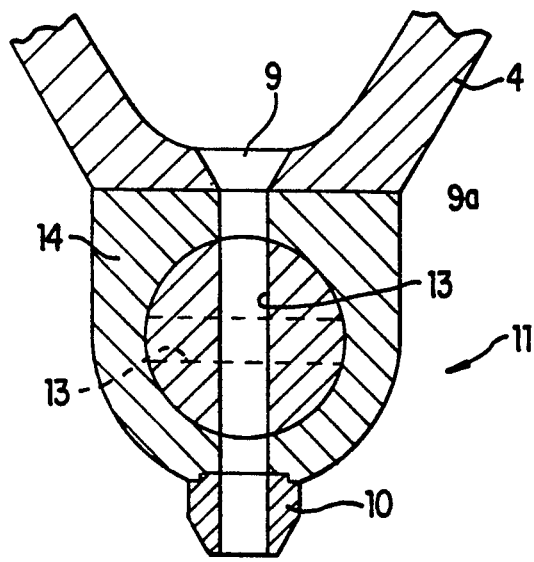
FIG. 2 is a section taken on the line II—II of FIG. 1.

The lower portion of the tank 4, which is usually funnel- or channel-shaped (see, in particular the sectional view of FIG. 2), has one or more openings 9 for delivering the product M through respective supply nozzles 10 which are located below the openings 9, and are usually funnel-shaped, with the interposition of valve devices 11 for controlling the delivery. The valves are usually in the form of valves with rotary obturators of the type currently known as cylindrical male obturators.

In the currently-preferred embodiment, the tank 4 is generally elongate so that it can be arranged above a horizontal conveyor T such as a continuous mat or belt driven by a drive unit M. The tank 4 is usually oriented generally transverse the direction of transportation of the conveyor T.

With reference to the viewpoint of FIG. 1, the direction of transportation of the conveyor is perpendicular to the plane of the sheet and the generally elongate tank 4 is thus aligned with the plane of the sheet.

In this embodiment, the openings 9 are thus arranged in a straight row which, since it extends substantially along the tank 4, is arranged transverse the direction of transportation of the underlying conveyor T. The supply nozzles 10 are arranged in a similar manner and the valve devices 11 may therefore include a single cylindrical male obturator which is common to all the valves and is constituted by a shaft 12 with diametral holes 13 corresponding to analogous pairs of openings 9 and nozzles 10. The shaft 12 is fitted sealingly so as to be rotatable about its own axis in a valve body 14 which in practice is constituted by a tubular casing fitted below the tank 4 in alignment with the openings 9.

At least one end of the shaft 12 is connected to a drive member 15. This member, which is constituted, for example, by an electric motor associated with a reduction unit, can rotate the shaft 12 between:

- a delivery position (shown in continuous outline in FIGS. 1 and 2), in which each of the diametral holes 13 is exactly aligned with a respective opening 9 (which communicates with the cavity in the tubular casing 14 through a corresponding opening 9a in the casing 14) and with the underlying delivery nozzle 10, so that the product M (the meringue mixture) can be discharged from the tank 4, and
- a closure position (shown schematically in broken outline in FIG. 2 only) in which the holes 13 are in positions approximately at right angles to their open positions, so as to close the openings 9 and 9a and thus prevent the product M from coming out of the tank 4.

Between the internal surface of the tubular casing 14 and the outer surface of the shaft 12, at least at the two ends of the shaft 12, there are preferably sealing elements 16 constituted, for example, by tubular seals.

The metered pouring of the mass M from the tank 4 towards the underlying conveyor T thus takes place as a result of the rotation of the shaft 12 (by the motor 15) between the open position and the closure position described above.

In particular, the quantity of the aerated product M delivered at any particular time will depend (if other factors such as the cross-sections of the openings 9 and 9a, of the holes 13 and of the nozzles 10 remain the same) upon the duration of the period for which the shaft 12 is kept in the open position.

The Applicant has found that the functional solution described enables aerated products such as, for example, meringue mixture, to be poured in extremely precise measured quantities even when the specific gravity of the product delivered is very low (for example, of the order of 0.3) and the measured quantities to be achieved are extremely small, for example, of the order of ¼ cm$^3$.

In particular, it has been found that, with the use of the solution according to the invention, none of the problems encountered with the supply of aerated products by pouring/batching machines according to the prior art (either of the type with pistons, or of the type with manifolds) occur in the nozzles 10 or in the delivery apertures (the openings 9, 9a and the holes 13).

Without wishing to be bound to any specific theory in this connection, this result seems to be attributable primarily to the fact that, in the machine according to the invention; the mass of the aerated product M to be delivered is kept, in a substantially continuous and static manner, under a moderate relative pressure (0.2-0.3 relative atmospheres) without the alternating intake and compress-ion stages which are typical of piston batching machines—under the action of the aeriform pressure plenum in the upper portion of the tank 4; this is quite unlike what occurs, on the other hand, in machines with manifolds, in which the product to be delivered is kept under dynamic pressure conditions by the pumping action of the device which supplies the product to the manifold (typically the turbo-mixer) with continual variations in the pressure level and conditions as a result of the opening and closing of the delivery nozzles and with pressure losses which differ according to the different paths which the mass of the product has to follow to reach the various supply nozzles.

Naturally, the principle of the invention remaining the same, the details of construction and forms of embodiment may be varied widely with respect to those described and illustrated, without thereby departing from the scope of the present invention. This applies specifically to the valve means for delivering the product being metered, which can be also constituted e.g. by counter-rotating toothed wheels or drums.

I claim:

1. A machine for the metered pouring of flowable aerated foamed food products, comprising:
   a closed tank for collecting the product to be poured, the tank having an inlet for receiving aerated foamed food products and a plurality of outlets adjacent the bottom of the tank for metered pouring of precise amounts of small quantities of the aerated foamed food products,
   supply means for supplying to the tank a mass of the aerated foamed food product to be poured through the inlet while leaving a portion of the tank empty of the product,
   pressure-regulating means for maintaining a substantially continuous and static aeriform pressure greater than atmospheric pressure in the empty portion of the tank,
   a movable obturator valve connected to the tank outlets, the valve being switchable selectively between an open position, in which the product can be freely discharged simultaneously from all the tank outlets in precise measured quantities through the valve, and a closed position, in which the valve obturator blocks the product from coming out of the tank, and
   a plurality of delivery nozzles, one for each outlet, the valve constituting the only obstruction to block flow of the aerated foamed food product from the tank to the nozzles.

2. A machine according to claim 1, wherein the apply means are constituted by a turbo-mixer device for producing the aerated foamed food product to be poured by the machine.

3. A machine according to claim 1, wherein the valve includes a movable obturator with a plurality of through holes which, in the open position, can be brought into alignment with the openings in the tank bottom.

4. A machine according to claim 3, wherein the obturator includes a rotatable body.

5. A machine according to claim 4, wherein the obturator is a cylindrical body with multiple holes.

6. A machine according to claim 1, wherein a conveyor device associated with the machine can move the product delivered by the machine along a path of movement in a predetermined direction, and in that the tank outlets for the product to be poured are in a row arranged generally transverse to the path of movement of the conveyor.

7. A method of metered pouring of precise small quantities of an aerated food product, the method comprising:
   a) producing the aerated food product;
   b) supplying the aerated food product produced to a closed chamber capable of holding fluids under pressure;
   c) filling the closed chamber to less than full with the aerated food product;
   d) maintaining and regulating the pressure of an aeriform mass at a pressure above atmosphere in the closed chamber above the aerated food product; and
   e) dispensing the aerated food product from the closed chamber through dispensing outlets utilizing the pressure of the aeriform mass.

8. A method as in claim 7, wherein the aerated food product is meringue and the aeriform, mass pressure is about 0.2–0.3 atmospheres.

* * * * *

UNITED STATES PATENT AND TRADEMARK OFFICE
CERTIFICATE OF CORRECTION

PATENT NO. : 5,273,188
DATED : December 28, 1993
INVENTOR(S) : Massimo Sanino

It is certified that error appears in the above-identified patent and that said Letters Patent is hereby corrected as shown below:

On cover page, item [56] "U.S. Patent Documents", "Harg" should be --Haig--.

Col. 1, between lines 7 and 8 (after "BACKGROUND OF THE INVENTION") insert --Field of the Invention--.

Col. 1, line 11, delete "1. Field of the Invention" and replace it with --Description of the Related Art--.

Col. 4, line 51, "compress-ion" should be --compression--.

Col. 5, line 33, "apply" should be --supply--.

Signed and Sealed this

Twenty-fourth Day of May, 1994

Attest:

BRUCE LEHMAN

Attesting Officer     Commissioner of Patents and Trademarks